US010983812B2

United States Patent
Chen et al.

(10) Patent No.: US 10,983,812 B2
(45) Date of Patent: Apr. 20, 2021

(54) REPLAYING INTERACTIONS WITH A GRAPHICAL USER INTERFACE (GUI) PRESENTED IN A VIDEO STREAM OF THE GUI

(71) Applicant: International Business Machines Corporation, Armonk, NY (US)

(72) Inventors: Hsiao-Yung Chen, New Taipel (TW); Wen-Ping Chi, New Taipei (TW); Hsin-Yu Hsieh, Taipei (TW); Wendy P. W. Wang, Taipei (TW); Hsiang-Wen Chen, Keelung (TW)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 16/195,753

(22) Filed: Nov. 19, 2018

(65) Prior Publication Data
US 2020/0159549 A1 May 21, 2020

(51) Int. Cl.
G06F 9/451 (2018.01)
G06F 3/0484 (2013.01)
H04N 21/431 (2011.01)

(52) U.S. Cl.
CPC .......... *G06F 9/453* (2018.02); *G06F 3/04842* (2013.01); *H04N 21/4312* (2013.01)

(58) Field of Classification Search
None
See application file for complete search history.

(56) References Cited

U.S. PATENT DOCUMENTS

| 5,558,339 A * | 9/1996 | Perlman | A63F 13/12 |
| | | | 463/42 |
| 7,213,051 B2 | 5/2007 | Zhu et al. | |
| 9,032,434 B2 | 5/2015 | Lee et al. | |

(Continued)

FOREIGN PATENT DOCUMENTS

CN 107580235 A 1/2018

OTHER PUBLICATIONS

Babaguchi, N. et al., "Linking Live and Replay Scenes in Broadcasted Sports Video", Proceedings of the 2000 ACM Workshops on Multimedia, Los Angeles, California, USA—Oct. 30-Nov. 3, 2000, pp. 205-208.

(Continued)

*Primary Examiner* — Henry Orr
(74) *Attorney, Agent, or Firm* — Konrad Raynes Davda & Victor LLP; David W. Victor (57) ABSTRACT

Provided are a computer program product, system, and method for replaying interactions with a graphical user interface (GUI) presented in a video stream of the GUI. Interaction with a rendered graphical user interface (GUI) to control an application is recorded to generate a video stream. In response to activation of a graphical element in the rendered GUI, an event action is rendered indicating a display region in which the graphical element was activated and a section of the video stream in which the activation of the graphical element occurred. The video stream is rendered. Selection is detected of a display region of the rendered video stream comprising the display region in the event action. The section of the video stream indicated in the event action is rendered in response to the selection of the display region indicated in the event action.

21 Claims, 6 Drawing Sheets

(56) References Cited

U.S. PATENT DOCUMENTS

| | | |
|---|---|---|
| 9,258,524 B2 | 2/2016 | DeLuca et al. |
| 9,363,480 B2* | 6/2016 | Ramalho ............... H04L 65/608 |
| 9,741,258 B1* | 8/2017 | Chetlur .................. G09B 5/12 |
| 10,063,939 B1* | 8/2018 | Hegde ............. H04N 21/23424 |
| 10,129,310 B1* | 11/2018 | Brunning ............ H04L 65/4092 |
| 10,387,175 B2* | 8/2019 | Grossman ............... G06F 9/453 |
| 2004/0070594 A1* | 4/2004 | Burke .................. G06F 16/735 715/716 |
| 2009/0259988 A1* | 10/2009 | Hertenstein ............... G06F 8/38 717/108 |
| 2010/0159425 A1* | 6/2010 | Hamlin .................... G09B 5/06 434/169 |
| 2010/0325549 A1 | 12/2010 | Gibson et al. |
| 2011/0052144 A1* | 3/2011 | Abbas .................. G11B 27/034 386/240 |
| 2011/0107220 A1* | 5/2011 | Perlman .................. A63F 13/12 715/720 |
| 2011/0202562 A1* | 8/2011 | Bloch .................. G06Q 10/101 707/776 |
| 2012/0028706 A1* | 2/2012 | Raitt ....................... A63F 13/10 463/31 |
| 2012/0324491 A1* | 12/2012 | Bathiche ................. H04H 60/33 725/10 |
| 2013/0129316 A1* | 5/2013 | Dontcheva ............... H04N 5/76 386/241 |
| 2015/0089520 A1* | 3/2015 | Lee ...................... H04N 21/251 725/14 |
| 2015/0177940 A1* | 6/2015 | Trevino .................. H04L 67/22 715/716 |
| 2018/0247676 A1* | 8/2018 | Raphael ........... H04N 21/47217 |

OTHER PUBLICATIONS

Dogan, E. et al., "Method for Providing Live Content During Playback of Recorded Streams in Personal Video Recorders", IEEE Transactions on Consumer Electronics, vol. 52, Issue 4, Nov. 2006, Total 3 pp.

English Abstract for CN107580235A, publihsed on Jan. 12, 2018, Total 1 p.

ip.com, "Smart Assistance for Meetings", ip.com Disclosure No. IPCOM000251788D, Dec. 4, 2017, Total 2 pp.

* cited by examiner

REPLAYING INTERACTIONS WITH A GRAPHICAL USER INTERFACE (GUI) PRESENTED IN A VIDEO STREAM OF THE GUI

BACKGROUND OF THE INVENTION

1. Field of the Invention

The present invention relates to a computer program product, system, and method for replaying interactions with a graphical user interface (GUI) presented in a video stream of the GUI.

2. Description of the Related Art

A video of a presentation of the operation of an application graphical user interface (GUI) may be distributed to users at remote sites to demonstrate the operation of the GUI to the users. The video presentation streamed to other users may show the GUI being controlled by the presenter to demonstrate various features and controls, such as menu items, icons, and interact with objects to demonstrate how the application GUI is used.

There is a need in the art for improved techniques for providing information on the operations and capabilities of a GUI.

SUMMARY

Provided are a computer program product, system, and method for replaying interactions with a graphical user interface (GUI) presented in a video stream of the GUI. Interaction with a rendered graphical user interface (GUI) to control an application is recorded to generate a video stream. In response to activation of a graphical element in the rendered GUI, an event action is rendered indicating a display region in which the graphical element was activated and a section of the video stream in which the activation of the graphical element occurred. The video stream is rendered. Selection is detected of a display region of the rendered video stream comprising the display region in the event action. The section of the video stream indicated in the event action is rendered in response to the selection of the display region indicated in the event action.

DETAILED DESCRIPTION

In prior art presentations of GUI demonstrations where the GUI demonstration is video streamed to different locations, the viewers are passive participants that receive and watch the video stream presentation and cannot interact with the video presentation to explore functions of interest observed during the video demonstration.

Described embodiments provide improved computer technology for a user to explore interaction with a GUI being presented in a video presentation to cause replay of an interaction with a graphical element previously displayed in the video presentation. This gives the user the impression they are interacting with the graphical element by replaying the result of interacting with the graphical element previously presented in the video presentation of the GUI.

Described embodiments provide improved computer technology and computer data structures to replay a portion of a rendered video stream by generating event actions in response to a presenter activating a graphical element in the GUI whose presentation is later streamed to viewers. The event action data structure indicates a display region in which the graphical element was activated and a section of the video in which the activation of the graphical element occurred. If a viewer rendering the video stream selects a display region of the video stream comprising the display region indicated in the event action, then the section of the video indicated in the event action is rendered with the video stream in response to detecting selection of the display region in the video presentation indicated in the event action. The use of improved new data structures, such as the event action, and processing of user interactions with the presentation of the video stream provides improved computer technology for replaying a portion of an interaction with a GUI.

Figure 1:
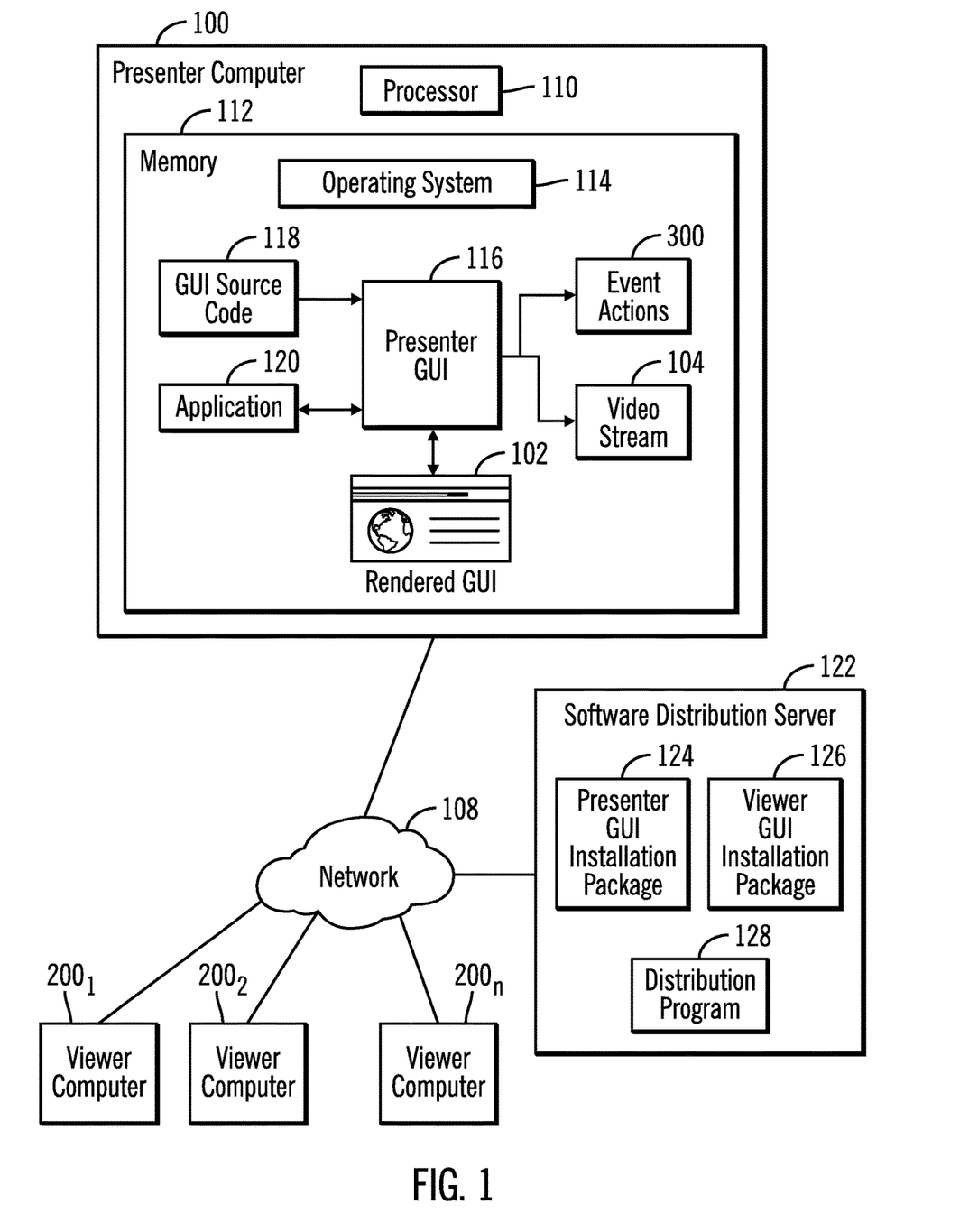
FIG. 1 illustrates an embodiment of a network computing environment in which a presenter computer distributes a video stream of an interaction with an application GUI to viewer computers.

FIG. 1 illustrates an embodiment of a presenter computer 100 that renders a Graphical User Interface (GUI) 102 converted to a video stream 104 that is transmitted to one or more viewer computers $200_1, 200_2 \ldots 200_n$ over a network 108 to render at the viewer computers $200_1, 200_2 \ldots 200_n$. The presenter computer 100 includes a processor 110 and a memory 112 including an operating system 114 and a presenter GUI program 116 to process GUI source code 118 to render the GUI 102 to interact with an application 120 executing in the memory 112. The presenter GUI 116 converts a display of presenter interaction with the rendered GUI 102 into the video stream 104 to distribute to the viewer computers $200_1, 200_2 \ldots 200_n$. The presenter GUI 116 further generates event actions 300 having information on presenter interactions with the rendered GUI 102 in which the presenter performs user interface actions, such as clicking graphical elements and objects, including menu items, graphical icons representing functions, and objects rendered in the GUI 102 generates a video stream. The user interface actions further include moving a scroll bar, dragging an object, selecting an object while holding mouse and/or keyboard buttons, clicking of different mouse buttons, e.g., right click, left click, etc.

The presenter GUI 116 may be used to distribute a demonstration of the rendered GUI 102 for the application 120 to the viewer computers $200_1, 200_2 \ldots 200_n$ to allow viewers, or users of the viewer computers $200_1, 200_2 \ldots 200_n$, to observe the demonstration in the video stream 104 and interact with the video stream 104 to replay portions of presenter interactions with the rendered GUI 102.

The video stream 104 may be in a suitable video format, such as Moving Picture Experts Group (MPEG), Audio Video Interleave (AVI), etc., which may be further compressed for transmission.

The source code 118 may implement the document object model (DOM) programming interface that represents the graphical elements to control the GUI 102 and application 120 as nodes and objects that have information on the graphical elements, such as coordinates in the rendered GUI 102 area, layout, color, and interaction with the GUI 102 and application 120.

The network 108 may comprise one or more networks including Local Area Networks (LAN), Storage Area Networks (SAN), Wide Area Network (WAN), peer-to-peer network, wireless network, the Internet, Intranets, etc.

Figure 2:
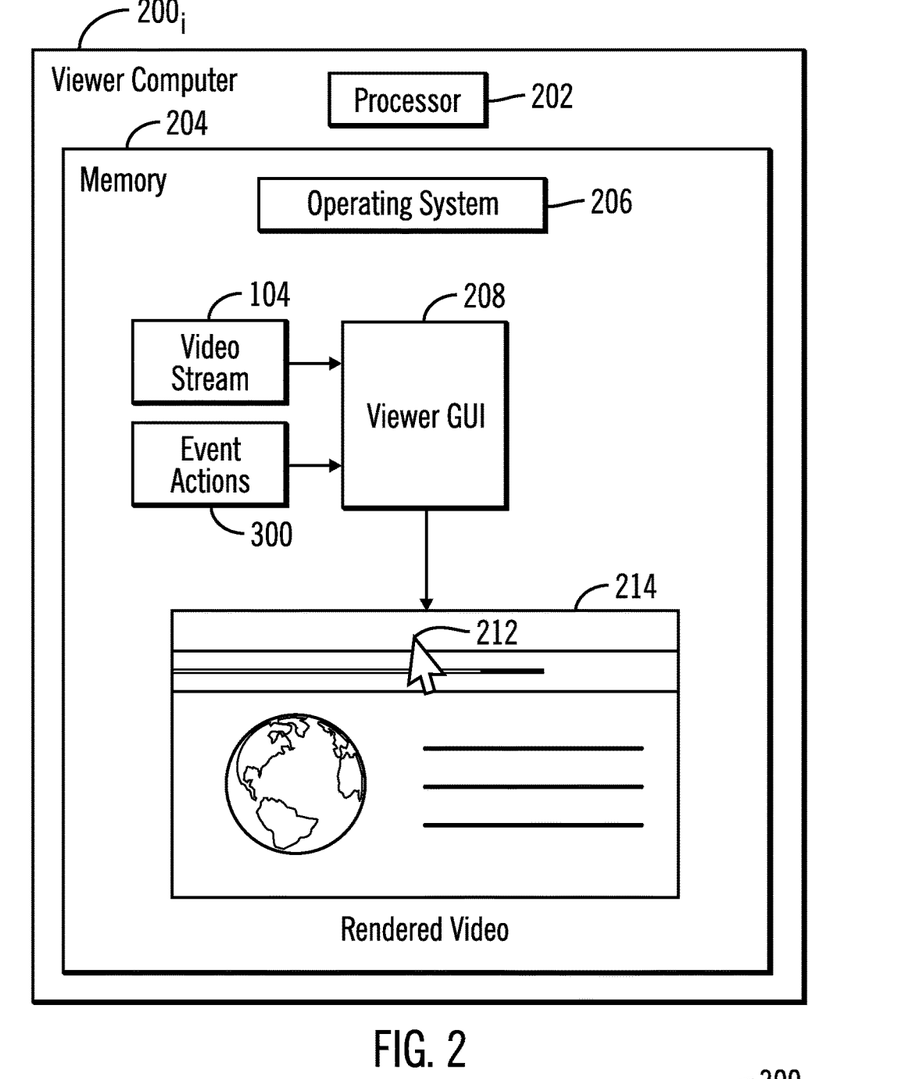
FIG. 2 illustrates an embodiment of a viewer computer receiving the video stream from the presenter computer to render at the viewer computer.

FIG. 2 illustrates an embodiment of a viewer computer $200_i$, such as one of the viewer computers $200_1$, $200_2$ ... $200_n$, receiving the video stream 104 and the event actions 300. The viewer computer $200_i$ includes a processor 202 and a memory 204 including an operating system 206 and a viewer GUI 208 to render the received video stream 104 in a rendered video 214. The viewer GUI 208 may further receive a viewer action with respect to the rendered video 214, such as via a mouse control 212, touch screen input, etc., to try to select a rendered graphical element in the rendered video 214. The viewer GUI 208 would determine whether the viewer action relates to an event action 300 and then render a section of the video having previous rendered presenter interaction with the GUI 102 matching the viewer action with respect to the rendered video 214.

The GUI 102 and rendered video 214 are rendered in the memory 112, 204 and then transmitted to a display monitor. The arrows shown in FIGS. 1 and 2 between the components in the memories 112, 204 represent a flow of information and commands between the components.

FIG. 1 further shows a software distribution server 122 connected to the network 108 that includes a presenter GUI installation package 124 to allow installation of the presenter GUI 116 at presenter computers 100 and a viewer GUI installation package 126 to allow installation of the viewer GUI 208 on the viewer computers $200_1$, $200_2$ ... $200_n$. The software distribution server 122 includes a distribution program 128 to distribute the presenter GUI installation package 124 and the viewer GUI installation package 126 using a suitable software distribution technique. In an Internet distribution environment, the distribution program 128 may comprise a Hypertext Transport Protocol (HTTP) server to respond to requests from a web browser, such as a Hypertext Markup, Language (HTML) for the installation packages 124, 126. In such embodiments, the GUIs 116, 208 may comprise plug-in programs to a web browser at the computers 100, $200_1$, $200_2$ ... $200_n$. The distribution program 128 may also implement additional or alternative file distribution techniques, such as the File Transfer Protocol (FTP), cloud file distribution protocols, email distribution, etc.

The distribution program 128 may further comprise an enterprise software distribution system that pushes the installation packages 124, 126 to the computers 100, $200_1$, $200_2$ ... $200_n$ to force the installation according to enterprise installation policies. The distribution program 128 may also manage requests for the installation packages 124, 126 to distribute on a computer storage medium, such as a Compact Disk (CD), Flash Drive, etc. via shipment.

Figure 3:
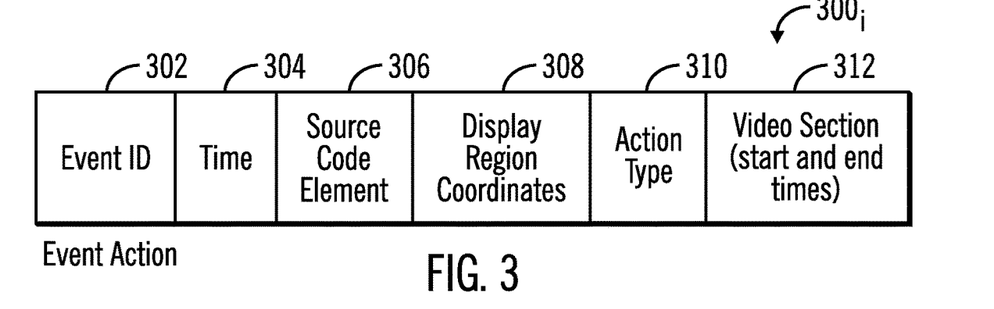
FIG. 3 illustrates an embodiment of an event action generated in response to user interface interactions with the presenter rendered GUI.

FIG. 3 is an embodiment of an event action $300_i$ generated by the presenter GUI 116, and includes an event identifier 302; a time 304 the event was captured; a source code element 306 in the GUI source code 118 from which the selected graphical element resulting in the event action 302 was generated; display region coordinates 308 indicating coordinates in the rendered GUI 102 at which the presenter action occurred at the presenter computer 100; an action type 310 with respect to the selected graphical element, such as a mouse click, moving a scroll bar, right click, touch operation, etc.; and a video section 312 to render with respect to the rendered video 214.

In one embodiment, the video section 312 may comprise a start and end times in the video stream 104 at which the presenter action resulting in the event 302 occurred. In an alternative embodiment, the video section 312 may comprise a captured section of the video showing the presenter action that resulted in the event action 302. The captured section may comprises a portion of the entire rendered GUI 102 including the display region affected by the user interaction, which may comprise a small portion of the entire screen area, such as a snippet. The presenter GUI 116 may utilize a video sniping tool to capture video in a portion of the rendered GUI 102.

Figure 4:
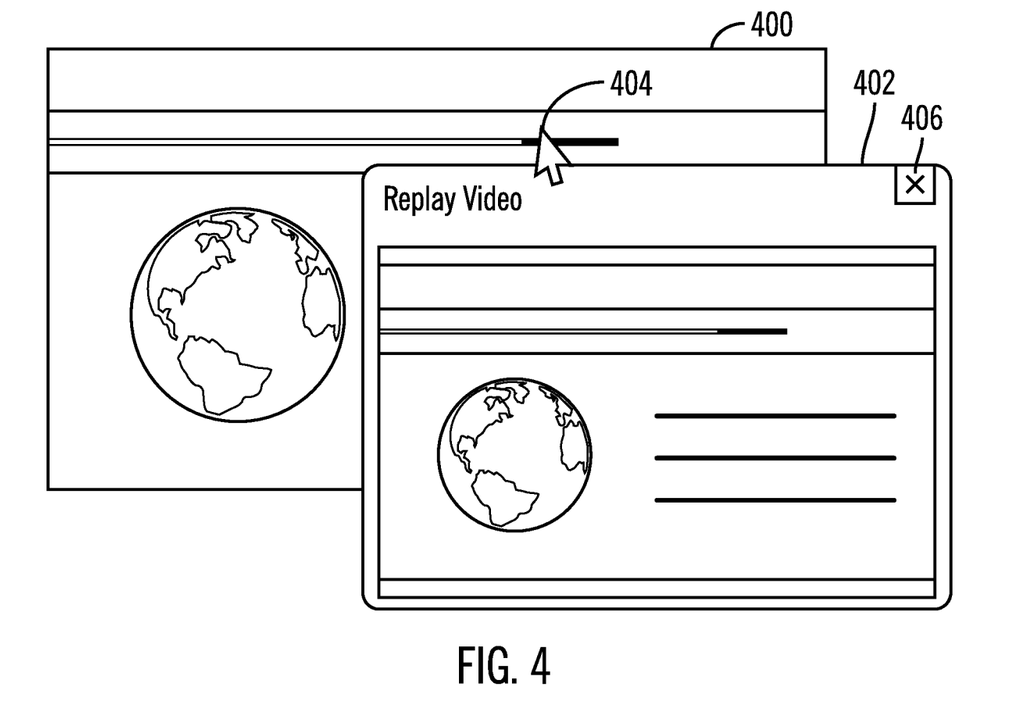
FIGS. 4 and 5 illustrate a rendering of a section of video for a selected GUI interaction with respect to a rendering of the video stream.

FIG. 4 illustrates an embodiment of the rendering of a rendered video 400, comprising the rendered GUI 102, along with a replay video window 402 to replay the video section 312 in the event action $300_i$ having the display region 308 the viewer selected with the graphical pointer 404. The replay video window 402 may be overlaid over all or a portion of the rendered video 400 not transparent or with a degree of transparency. The presenter GUI 116 may continue to render the main video 400 while the replay video window 402 is briefly rendered. After the video completes, the replay window 402 may automatically close and the rendered video 400 continues to stream, as it was during the rendering of the replay video 402. In an alternative embodiment, the rendered video 400 may pause while the replay video 402 is displayed. In a further embodiment, the viewer may close the replay video window 402 by selecting the close icon 406 before or after the video completes.

Figure 5:
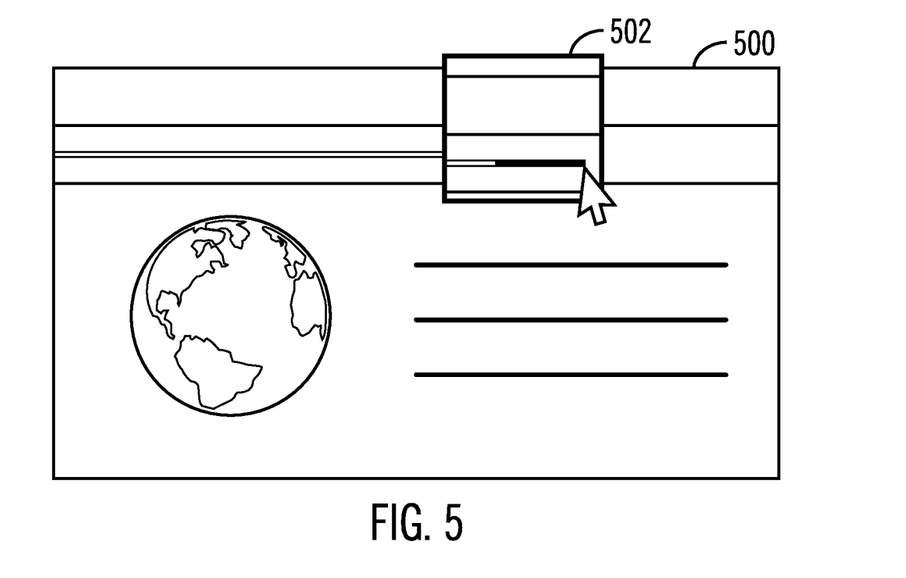

FIG. 5 illustrates an alternative embodiment of a rendered video 500, comprising the rendered GUI 102, along with a replay video window 502 to replay the video section 312 comprising a small section of captured video including the area affected by the presenter action recorded for the event action $300k$. The video section 502 may be resized to fit into the viewer rendered video 500 and to match the resolution of the viewer rendered video 500.

Figure 6:
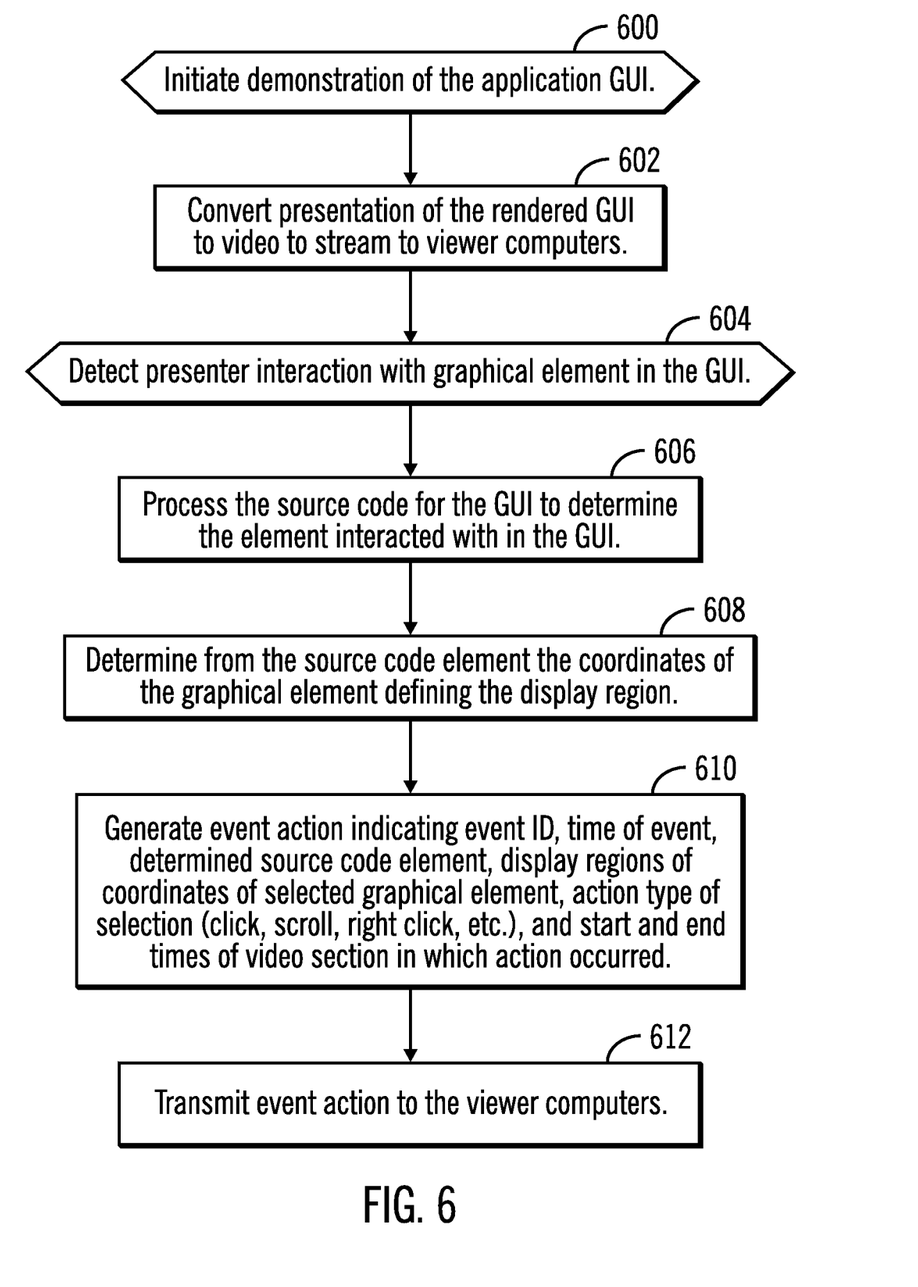
FIG. 6 illustrates an embodiment of operations performed at the presenter GUI to generate a video stream and event actions from the rendering of the GUI by the presenter.

FIG. 6 illustrates an embodiment of operations performed by the presenter GUI 116 to generate the video stream 104 and event actions 300 to distribute to the viewer computers $200_1$, $200_2$ ... $200_n$. Upon initiating (at block 600) a demonstration of the rendered GUI 102 controlling the application 120, the presenter GUI 116 converts (at block 602) a presentation of the rendered GUI 102 to video 104 to continuously stream to the viewer computers $200_1$, $200_2$ ... $200_n$. Upon detecting (at block 604) presenter interaction, e.g., click, scroll, etc., with a graphical element, e.g., menu item, object, icon, etc., in the rendered GUI 102, the presenter GUI 116 processes (at block 606) the source code 118 for the GUI 102 to determine the element interacted with in the GUI, such as a DOM element. Coordinates of the interacted graphical element defining a display region may be determined (at block 608) from the source code 118.

Alternatively, the coordinates of the graphical element may be determined from coordinates of a cursor that was used to interact with the graphical element in the GUI 102. The presenter GUI 116 generates (at block 610) an event action $300_i$ indicating event ID 302, time of event 304, determined source code 118 element 306, display regions of coordinates 308 of the selected graphical element, action type 310 of selection (click, scroll, right click, etc.), and start and end times of video section 312 in which action occurred. The event action is transmitted to the viewer computers $200_1, 200_2 \ldots 200_n$.

With the embodiment of FIG. 6, the presenter GUI 116 generates the video presentation of the GUI 102 interaction to demonstrate the functions of the GUI 102 and interactions to control the application 120 by converting the rendered GUI 102 demonstration to video to stream. Further, by generating the event actions $300_i$ of the interactions with the presenter GUI, the viewer of the presentation may interact with displayed graphical elements in the video stream to cause a replay of the presenter interaction with the graphical element to simulate the interaction at the viewer computer. In this way, the viewer may replay those interactions of interest that they want to explore further by allowing the viewer to perform a virtual action with respect to the graphical element and simulate using replay video the response in the application GUI 102. This simulation allows the viewer to select to interact with certain graphical elements observed in the rendered video 214 of the demonstration at the presenter GUI 102 and observe the result of that interaction by the processing of the event action to replay the action that occurred in the rendered video 214 that the viewer previously observed.

Figure 7:
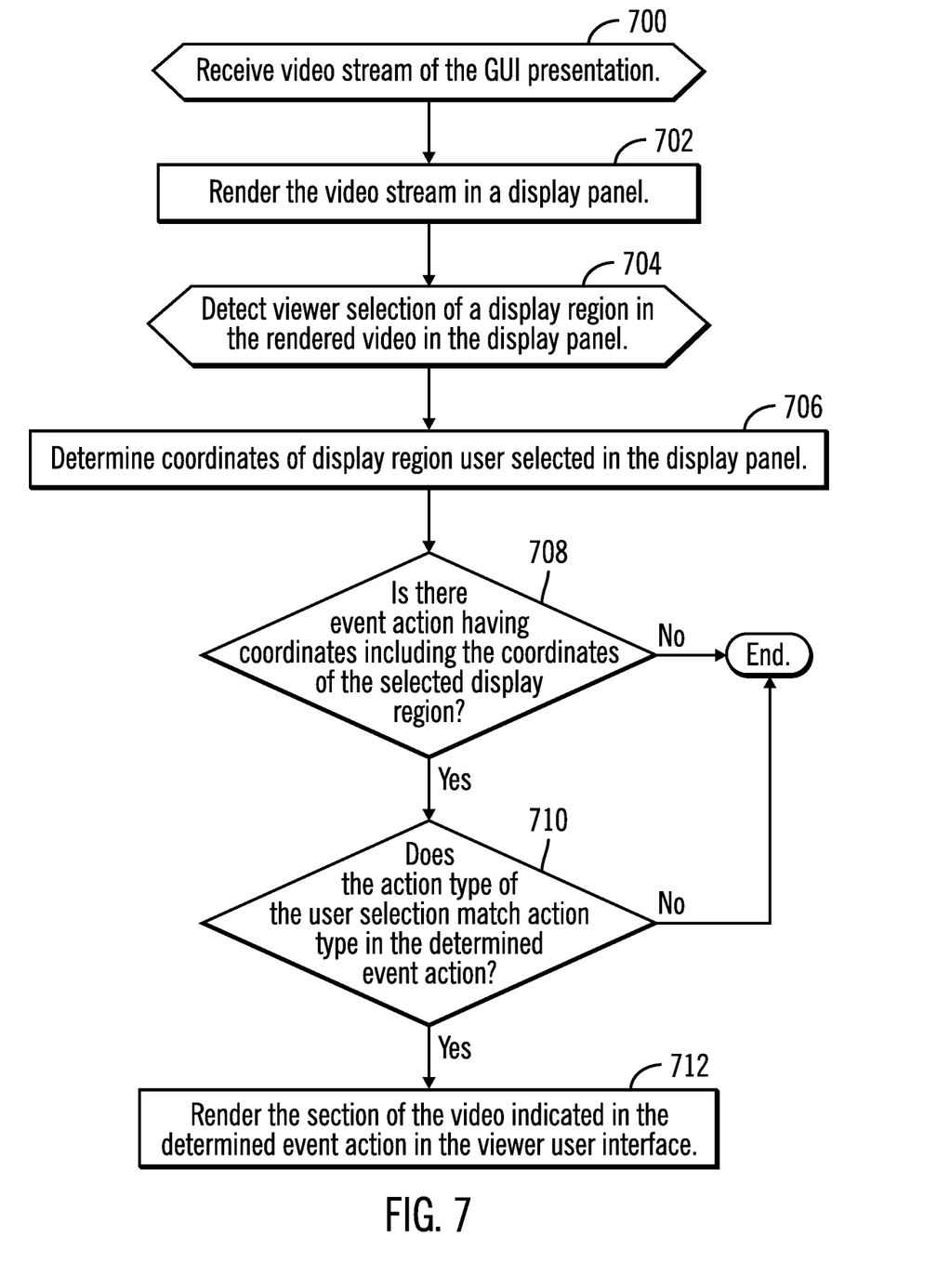
FIG. 7 illustrates an embodiment of operations performed by the viewer GUI to replay a section of video for a selected GUI interaction with the rendering of the video stream.

FIG. 7 illustrates an embodiment of operations performed by the viewer GUI 208 to render the video stream 104 and replay viewer interface action at the presenter GUI 116 using the received event actions 300. Upon receiving (at block 700) a video stream 104 of the rendered GUI 102 presentation, the viewer GUI 208 renders (at block 702) the video stream 104 in a display panel 214. Upon detecting (at block 704) viewer selection with an input device of a display region in the rendered video 214, the viewer GUI 208 determines (at block 706) coordinates of the display region the viewer selected in the display panel 214. If (at block 708) there is an event action $300_i$ having coordinates 308 including the coordinates of the selected display region and if (at block 710) the action type of the viewer selection, e.g., right click, left click, scroll, double click, etc., matches the action type 310 in the event action $300_i$ having the selected display region, then the viewer GUI 208 renders (at block 712) the section of the video 312 indicated in the determined event action in the viewer user interface. The section of the video 312 may comprise start and end times in the video stream 104 which are replayed as shown in FIG. 4 or comprise a snippet or section of the video 502 as shown in FIG. 5, which is then resized and replayed overlaid as onto the display region the user selected in the rendered video stream 500.

With the embodiment of FIG. 7, if the viewer at the viewer computer $200_i$ tries to select a graphical element appearing in the rendered video 214, then the viewer GUI 208 may determine an event action $300_i$ corresponding to the selected display region and action type of the selection having video of the result of the action in the rendered GUI 102 in the presenter computer 100. This allows the viewer to determine which portions of the demonstration of the GUI to replay by having the viewer mimic selection of a graphical element in the rendered GUI 214 to then cause the rendering of the result of that actual selection action by the presenter that occurred in the rendered GUI 102 in the presenter computer 100. In this way the embodiment of FIG. 7 provides a more robust demonstration of a GUI by allowing viewers to interact with the graphical elements they observed in the presentation of the video stream to selectively replay user interface interactions of interest.

The reference characters used herein, such as i and n, and any others, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
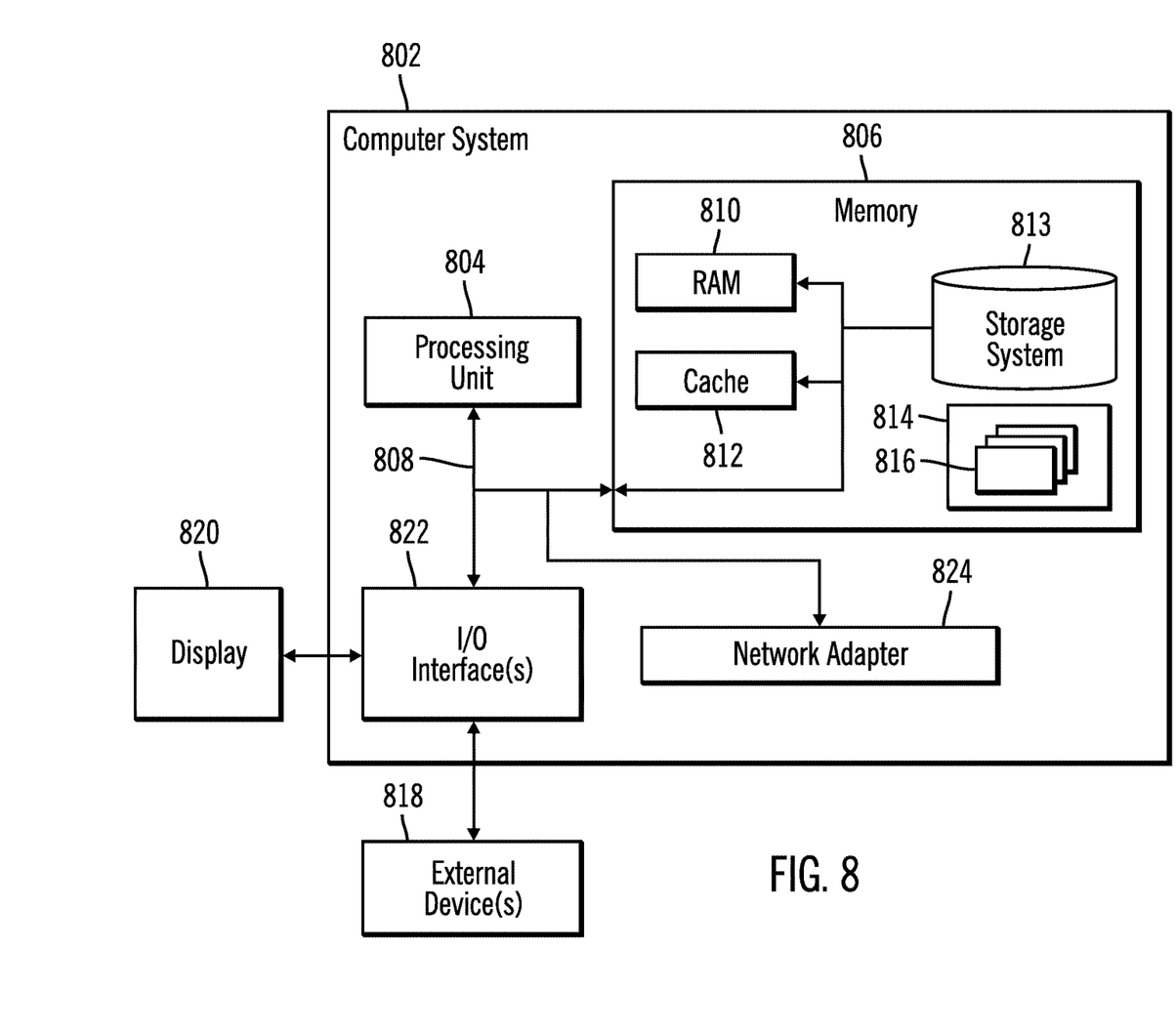
FIG. 8 illustrates a computing environment in which the components of FIGS. 1 and 2 may be implemented.

The computational components of FIGS. 1 and 2, including the presenter computer 100, viewer computers $200_1$, $200_2 \ldots 200_n$, and software distribution server 122 may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for replaying video, wherein the computer program product comprises a computer readable storage medium having program instructions executed by a processor to cause operations, the operations comprising:

recording interactions with a rendered graphical user interface (GUI) to control an application to generate a video stream;

in response to activation of a graphical element in the rendered GUI while the interactions with the rendered GUI are recorded, generating an event action indicating:

coordinates of a display region in the rendered GUI at which the graphical element was activated; and a section of the video stream at which the activation of the graphical element occurred, wherein the section of the video stream indicates at least one of a (i) start and end times in the video stream at which the activation occurred and (ii) a captured section of the video stream showing the rendered GUI resulting from the activation of the graphical element, wherein the captured section comprises at least a portion of an entire area of the rendered GUI;

rendering the video stream;

detecting selection of a display region of the rendered video stream, wherein the display region comprises coordinates within the rendered video stream;

determining whether the coordinates of the display region in the event action include at least a portion of the coordinates of the selected display region in the rendered video stream; and rendering the section of the video stream indicated in the event action in response to the coordinates of the display region indicated in the event action including at least the portion of the coordinates of the selected display region.

2. The computer program product of claim 1, wherein the section of the video stream is rendered in response to detecting the selection after the section of the video stream was rendered as part of the rendering of the video stream.

3. The computer program product of claim 1, wherein the section of the video stream is rendered concurrently with the rendering of the video stream.

4. The computer program product of claim 1, wherein the event action further indicates an action type performed when activating the graphical element in the rendered GUI, wherein the operations further comprises:

detecting that the selection of the display region comprises a same action type as the action type indicated in the event action, wherein the rendering the section of the video stream is performed in response to the selection of the display region comprising the action type indicated in the event action indicating the display region.

5. The computer program product of claim 1, wherein the operations further comprise:
processing source code of the GUI to determine an element in the source code corresponding to the activated graphical element, wherein the element in the source code defines the display region as coordinates within the rendered GUI, wherein the display region included in the event action is determined from the coordinates in the element in the source code corresponding to the activated graphical element.

6. The computer program product of claim 1, wherein the operations further comprise:
capturing a section of the video stream in a video capture region in the rendered GUI of a result of the activation of the graphical element, wherein the video capture region includes an area around the display region that is less than an entire area of the rendered GUI; and
saving the captured section of the video stream with the event action, wherein the rendering the section of the video stream comprises rendering the captured section of the video stream.

7. The computer program product of claim 1, wherein there are a plurality of generated event actions for activations of graphical elements in different display regions of coordinates in the rendered GUI.

8. The computer program product of claim 7, wherein the detecting the selection of the display region comprises:
detecting selection of the coordinates of the display region in the rendered video stream;
determining coordinates of a display region in the GUI corresponding to the selected display region in the video stream; and
determining whether the determined coordinates of the display region in the GUI is indicated in an event action of the event actions, wherein the section of the video stream indicated in the event action, indicating the determined coordinates of the display region, is rendered.

9. The computer program product of claim 7, wherein the GUI is rendered at a first computing system and the video stream and the section of the video stream are rendered at a second computing system, wherein the generating the event action is performed at the first computing system, and wherein the rendering the video stream, detecting selection of the display region, and the rendering the section of the video stream are performed in the second computing system, wherein the operations further comprise:
transmitting the event action from the first computing system to the second computing system.

10. A system for distributing software to a presenter computer and a viewer computer, comprising:
a processor; and
a computer readable storage medium having program instructions executed by the processor to cause operations, the operations comprising:
distributing a presenter graphical user interface (GUI) program to install at the presenter computer to cause the presenter computer to:
record interactions with a rendered graphical user interface (GUI) to control an application to generate a video stream; and
in response to activation of a graphical element in the rendered GUI while the interactions with the rendered GUI are recorded, generate an event action indicating:
coordinates of a display region in the rendered GUI at which the graphical element was activated; and
a section of the video stream at which the activation of the graphical element occurred, wherein the section of the video stream indicates at least one of a (i) start and end times in the video stream at which the activation occurred and (ii) a captured section of the video stream showing the rendered GUI resulting from the activation of the graphical element, wherein the captured section comprises at least a portion of an entire area of the rendered GUI;
distributing a viewer graphical user interface (GUI) program to install at the viewer computer to cause the viewer computer to:
render the video stream; and
detect selection of a display region of the rendered video stream, wherein the display region comprises coordinates within the rendered video stream;
determining whether the coordinates of the display region in the event action include at least a portion of the coordinates of the selected display region in the rendered video stream; and
render the section of the video stream indicated in the event action in response to the coordinates of the display region indicated in the event action including at least the portion of the coordinates of the selected display region.

11. The system of claim 10, wherein the viewer GUI program renders the section of the video stream in response to detecting the selection after the section of the video stream was rendered as part of the rendering of the video stream.

12. The system of claim 10, wherein the event action further indicates an action type performed when activating the graphical element in the rendered GUI, wherein the viewer GUI program further executes at the viewer computer to:
detect that the selection of the display region comprises a same action type as the action type indicated in the event action, wherein the rendering the section of the video stream is performed in response to the selection of the display region comprising the action type indicated in the event action indicating the display region.

13. The system of claim 10, wherein the presenter GUI program further executes at the presenter computer to:
capture a section of the video stream in a video capture region in the rendered GUI of a result of the activation of the graphical element, wherein the video capture region includes an area around the display region that is less than an entire area of the rendered GUI; and
save the captured section of the video stream with the event action, wherein the rendering the section of the video stream comprises rendering the captured section of the video stream.

14. The system of claim 10, wherein there are a plurality of generated event actions for activations of graphical elements in different display regions of coordinates in the rendered GUI.

15. The system of claim 14, and wherein the viewer GUI program executes at the viewer computer to detect the selection of the display region by:

detecting selection of the coordinates of the display region in the rendered video stream;
determining coordinates of a display region in the GUI corresponding to the selected display region in the video stream; and
determining whether the determined coordinates of the display region in the GUI is indicated in an event action of the event actions, wherein the section of the video stream indicated in the event action, indicating the determined coordinates of the display region, is rendered.

16. A method for replaying video, comprising:
recording interactions with a rendered graphical user interface (GUI) to control an application to generate a video stream;
in response to activation of a graphical element in the rendered GUI while the interactions with the rendered GUI are recorded, generating an event action indicating:
coordinates of a display region in the rendered GUI at which the graphical element was activated; and
a section of the video stream at which the activation of the graphical element occurred, wherein the section of the video stream indicates at least one of a (i) start and end times in the video stream at which the activation occurred and (ii) a captured section of the video stream showing the rendered GUI resulting from the activation of the graphical element, wherein the captured section comprises at least a portion of an entire area of the rendered GUI;
rendering the video stream;
detecting selection of a display region of the rendered video stream, wherein the display region comprises coordinates within the rendered video stream;
determining whether the coordinates of the display region in the event action include at least a portion of the coordinates of the selected display region in the rendered video stream; and
rendering the section of the video stream indicated in the event action in response to the coordinates of the display region indicated in the event action including at least the portion of the coordinates of the selected display region.

17. The method of claim 16, wherein the section of the video stream is rendered in response to detecting the selection after the section of the video stream was rendered as part of the rendering of the video stream.

18. The method of claim 16, wherein the event action further indicates an action type performed when activating the graphical element in the rendered GUI, further comprising:
detecting that the selection of the display region comprises a same action type as the action type indicated in the event action, wherein the rendering the section of the video stream is performed in response to the selection of the display region comprising the action type indicated in the event action indicating the display region.

19. The method of claim 16, further comprising:
capturing a section of the video stream in a video capture region in the rendered GUI of a result of the activation of the graphical element, wherein the video capture region includes an area around the display region that is less than an entire area of the rendered GUI; and
saving the captured section of the video stream with the event action, wherein the rendering the section of the video stream comprises rendering the captured section of the video stream.

20. The method of claim 16, wherein there are a plurality of generated event actions for activations of graphical elements in different display regions of coordinates in the rendered GUI.

21. The method of claim 20, and wherein the detecting the selection of the display region comprises:
detecting selection of the coordinates of the display region in the rendered video stream;
determining coordinates of a display region in the GUI corresponding to the selected display region in the video stream; and
determining whether the determined coordinates of the display region in the GUI is indicated in an event action of the event actions, wherein the section of the video stream indicated in the event action, indicating the determined coordinates of the display region, is rendered.

* * * * *